United States Patent [19]

Callison

[11] Patent Number: 4,632,361
[45] Date of Patent: Dec. 30, 1986

[54] SCHEDULED FLUID CONTROL VALVE

[75] Inventor: Douglas A. Callison, Des Moines, Iowa

[73] Assignee: Callison & Associates Limited Partnership, Urbandale, Iowa

[21] Appl. No.: 773,578

[22] Filed: Sep. 9, 1985

Related U.S. Application Data

[62] Division of Ser. No. 461,120, Jan. 26, 1943.

[51] Int. Cl.$^4$ ............................................. F16K 31/528
[52] U.S. Cl. ............................... 251/230; 137/624.14; 137/624.18; 239/66; 239/570; 251/252
[58] Field of Search ........................ 137/624.11, 624.13, 137/624.14, 624.18; 239/66, 570; 251/230, 252

[56] References Cited

U.S. PATENT DOCUMENTS

| | | | |
|---|---|---|---|
| 2,793,908 | 5/1957 | Carver, Jr. | 137/624.14 |
| 3,018,788 | 1/1962 | Perlis | 137/624.14 |
| 3,147,770 | 9/1964 | Perlis | 239/66 |
| 3,236,260 | 2/1966 | Halsey | 137/624.18 |
| 3,408,006 | 10/1968 | Stanwood | 239/66 |
| 3,459,208 | 8/1969 | Clyde | 137/624.14 |
| 4,051,767 | 10/1977 | Landsberg | 137/624.18 |
| 4,116,216 | 9/1978 | Rosenberg | 251/230 |
| 4,226,365 | 10/1980 | Norris et al. | 239/66 |

Primary Examiner—George L. Walton
Attorney, Agent, or Firm—Kent A. Herink; G. Brian Pingel

[57] ABSTRACT

A scheduled fluid control valve which performs a pre-established sequence of flow rates and timing schedules in response to pressure pulses in the controlled fluid. The valve consists of a generally cylindrical housing connected to a source of pressurized fluid and containing circular plates of cylindrical control surfaces coupled to actuating means responsive to the presence of pressurized fluid. The actuating means includes an actuator plate or cylinder, a biasing spring, and a longitudinal shaft or cylinder upon which is incised at least one generally helical groove within which track one or more follower pins. Pressurized fluid causes the actuator plate or cylinder to rotate, following the path defined by the helical groove, resulting in relative movement of the control surfaces whereby the schedule embodied in the relative size and placement of fluid ports through the control surfaces is performed. A plurality of control surfaces may be substituted to select a large number of fluid flow schedules and flow rates.

2 Claims, 9 Drawing Figures

FIG. 8

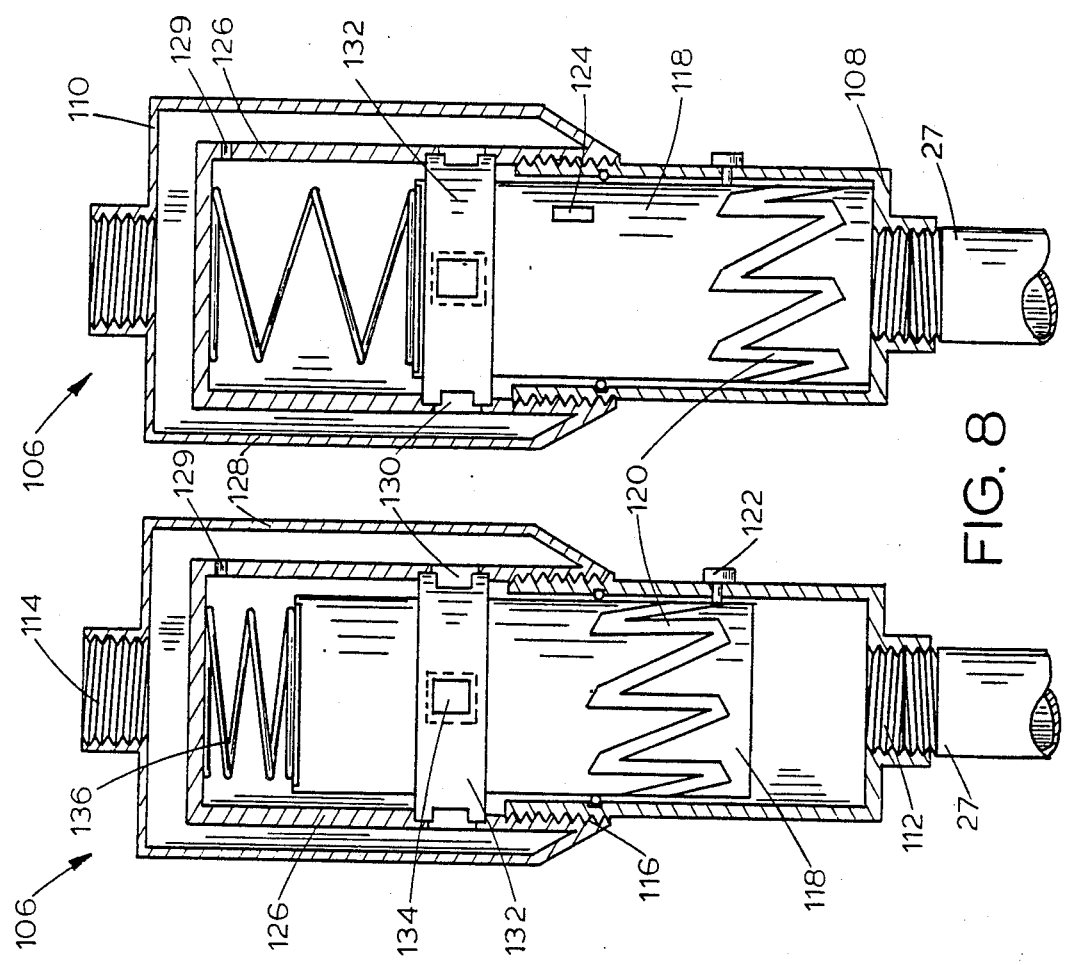
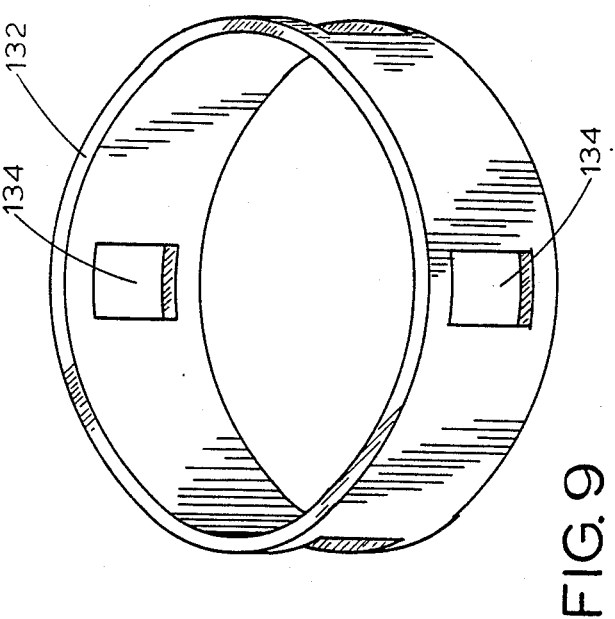

SCHEDULED FLUID CONTROL VALVE

This is a division of application Ser. No. 461,120, filed Jan. 26, 1983.

BACKGROUND OF THE INVENTION

Field of the Invention

The present invention is directed generally to scheduled fluid control valves and, more specifically, to fluid control valves which perform a pre-established schedule in response to pressure variations in the controlled fluid.

Pressurized fluid distribution systems are used throughout a large variety of industries, from oil pipelines to lawn watering systems. Remote valves are often required to control such systems and are generally operated by electrical or pneumatic signals received from a central location. These control systems require an electrical or pneumatic motor or solenoid valve actuator at each remote valve and electrical control wires or control pipes connecting the motors to the central control location. As a result, the additional equipment and installation adds significantly to the cost of the distribution system, making the controlled system commercially impractical in certain applications.

There is a need in the art for an inexpensive, reliable valve which does not require additional equipment, pipes, or wiring to perform a control schedule. A number of valves attempt to address this problem using variations or pulses in a controlled fluid. For example, U.S. Pat. Nos. 2,793,908 (Carver, 1957) and 3,459,208 (Clyde, 1969) disclose fluid actuated valves utilizing drums containing continuous series of notches whereby fluid flow through the devices is controlled. As a result of internal construction, both of these valves are dependent upon vertical orientation. Additionally, U.S. Pat. No. 4,196,654 (Stearns, 1980) teaches a valve motor which may be used to reciprocally rotate a valve ninety degrees (90°) in response to certain minimum variations in the pressure of a separate controlling fluid. The Stearns device, however, is not operable as a controlled valve itself because it requires a controlled fluid system in addition to the system in which the valve would be inserted. Further, the known valves do not allow for adjustments in the flow of the fluid through the valve as a variable to be added to the schedule performed by the valve.

The present invention is a simple, reliable and inexpensive valve that performs a pre-established schedule operated by pressure pulses in the controlled fluid itself. The valve responds to changes in the pressure of the controlled fluid by performing a pre-established cycle having a pattern of steps which are selectively initiated by the fluid pressure pulses. Use of the valves in a distribution system, allows the system to be divided into a number of coordinated portions each performing its assigned schedule.

The valves may be added to a pre-existing, installed system without the use of additional control equipment. Further, the valve may be manually adjusted to provide a plurality of flow rates and timing schedules to accommodate a wide variety of conditions.

It is therefore an object of the present invention to provide an improved scheduled fluid control valve that employs pressure pulses in the controlled fluid to perform a pre-established schedule.

It is another object of the present invention to provide a scheduled fluid control valve that may be installed in pre-existing fluid distribution systems without additional control equipment.

It is a further object of the present invention to provide an improved scheduled fluid control valve that may be easily altered to perform a variety of schedules.

It is another object of the present invention to provide an improved scheduled fluid control valve that may also be used to limit the flow rate of fluid through the valve according to a pre-established schedule.

It is a further object of the present invention to provide an improved scheduled fluid control valve that is adaptable to a wide range of distribution system pressures by appropriate adjustment, fabrication materials, and tolerances.

BRIEF DESCRIPTION OF THE INVENTION

The present invention is a fluid pressure actuated scheduled control valve providing fluid control means which may be remotely located without associated control pipes or wiring. It incorporates a housing with an inlet portion to which is attached a supply of pressurized fluid to be controlled. The device includes either cylindrical or generally circular control surfaces which contain one or more ports through which fluid may be directed. The control surfaces are rotated with respect to each other by generally cylindrical actuating means consisting of an actuator plate or cylinders, a biasing spring and a longitudinal shaft or cylinder upon which has been incised at least one generally helical groove. Tracking within the groove are one or more follower pins associated with the actuator plate or cylinder. When pressurized fluid enters the valve, the actuating means cause the control surfaces to move relative to one another whereby the schedule embodied in relative size and placement of the ports of the control surfaces to the helical grooves is performed. The schedule may be selectively varied by substitution of a variety of control surface types.

BRIEF DESCRIPTION OF THE DRAWINGS

FIG. 8 is a partial cross-sectional view of a preferred embodiment of the invention showing the use of and the relative position of two cylindrical control surfaces.

FIG. 9 is a perspective view of an annular gasket for use with the embodiment of the invention illustrated in FIG. 8.

DETAILED DESCRIPTION OF PREFERRED EMBODIMENTS

Figure 1:
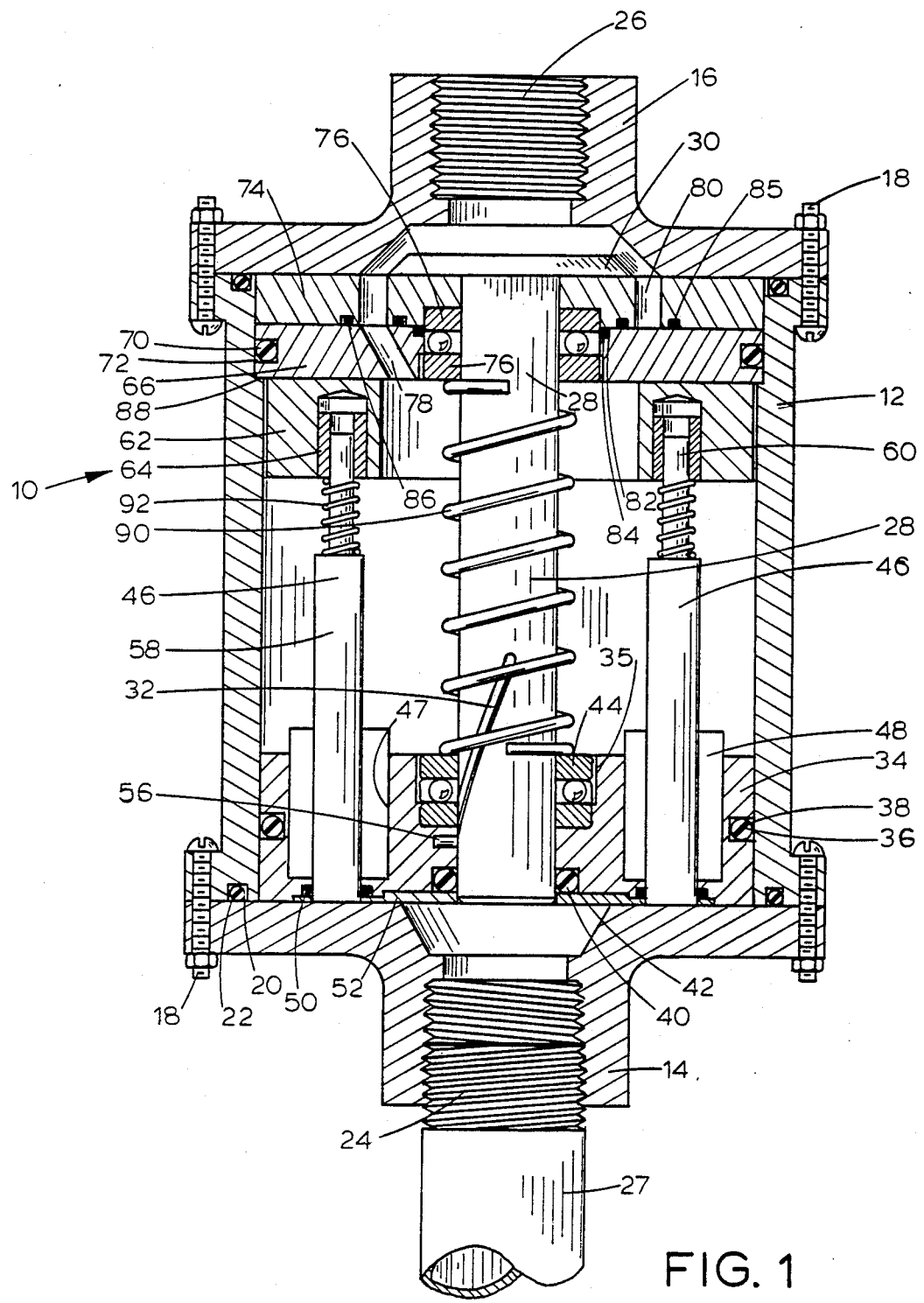
FIG. 1 is a partial cross-sectional view of a preferred embodiment of the improved scheduled fluid control valve showing the cylindrical shaft and guide pins in full view and other internal details of construction.

A partial cross-sectional view of a preferred embodiment of the scheduled fluid control valve of the present invention is illustrated in FIG. 1, as generally designated at 10. The valve 10 includes a hollow, generally cylindrical housing consisting of a cylindrical casing 12 interposed between an inlet end plate 14 and an outlet end plate 16. The ends of the casing 12 are flanged to provide sites for the attachment of the casing 12 to the two end plates 14 and 16. In a preferred embodiment, a plurality of screws 18 are used to attach the casing 12 to the two end plates 14 and 16. Nevertheless, any suitable attachment means may be employed, including adhesive or other bonding means.

A casing O-ring channel 20 is formed along both ends of the casing 12. Upon insertion of a casing O-ring 22 in the channel 20 and attachment of the end plates 14 and 16, the O-rings 22 form a fluid-tight seal between the ends of the casing 12 and the end plates 14 and 16.

Threaded couplings 24 and 26, are formed in the end plates 14 and 16 respectively. The threaded couplings 24 and 26 are adapted to threadedly receive a fluid supply line 27 and an outlet line (not shown). The threaded couplings 24 and 26 permit fluid communication with the interior surfaces of the end plates 14 and 16, whereby fluid may pass into and out of the valve 10.

Disposed within the valve casing 12 is a generally cylindrical shaft 28, the longitudinal axis of which coincides with that of the valve casing 12. The shaft 28 is formed with a shaft flange 30, presently the shape of a truncated cone or frustrum and directed toward the outlet end plate 16. The inlet or upstream end of the shaft 28 is chamfered to facilitate assembly of the valve. The length of the cylindrical shaft 28 absent the shaft flange 30 is approximately the length of the casing 12.

The shaft 28 illustrated in the embodiment of the valve 10 shown in FIG. 1 also carries a generally helical groove 32 extending from the inlet end of the shaft 28 and directed along the surface of the shaft 28 toward the outlet end of the shaft 28. In a working embodiment, as illustrated in FIG. 1, the length and helical shape of the groove 32 define a 90 degree arc about the shaft 28 from the upstream end of the groove 32 to the downstream end of the groove 32.

An actuator plate 34 is located coaxial with the casing 12 and receives the upstream, chamfered end of the shaft 28 in a shaft-receiving aperature 35. The actuator plate 34 is formed of a diameter to permit it to slide along the shaft 28 within the casing 12. A fluid-tight seal with casing 12 and the actuator plate 34 is achieved by an exterior actuator plate O-ring 36 seated within an associated O-ring channel 38 along the exterior circumference of the plate 34. A similar seal is achieved between the actuator plate 34 and the shaft 28 by an interior actuator plate O-ring 40 and an associated O-ring channel 42 along the interior circumference of the shaft-receiving aperature 35 of actuator plate 34.

The downstream portion of shaft-receiving aperture 35 of the actuator plate 34 is enlarged to receive a thrust bearing 44 which is carried by the actuator plate 34 as the plate moves along the shaft 28. The thrust bearing 44 acts to limit transverse or radial movement of the shaft 28 with respect to the actuator plate 34 thereby insuring smooth movement of the actuator plate 34 along the shaft 28 while maintaining the coaxial relationship between the casing 12 and the shaft 28.

The actuator plate 34 carries four guide pin bushings 48, each of which receives a guide pin 46. The bushings 48 and the associated pins 46 are spaced at ninety degree (90°) intervals about the actuator plate 34, and equidistant from the axis thereof. A fluid-tight seal is provided between the pins 46 and the walls of receiving apertures 47 in the actuator plate 34 at a point slightly upstream from the ends of bushings 48 by four O-rings 50. The O-rings 50 are seated within channels formed by the walls of the receiving aperatures 47 and by a portion of an insert plate 52 which is fixed to the upstream side of the actuator plate 34. The insert plate 52 serves to contain the O-rings 50 during movement of the plate 34.

The guide pins 46 consist of a generally cylindrical rod defining two coaxial cylinders of different diameters. A larger diameter cylindrical rod 58 comprises the upstream end of the guide pins 46 and a smaller diameter cylindrical rod 60 comprises the downstream end of the guide pins 46.

Figure 7:
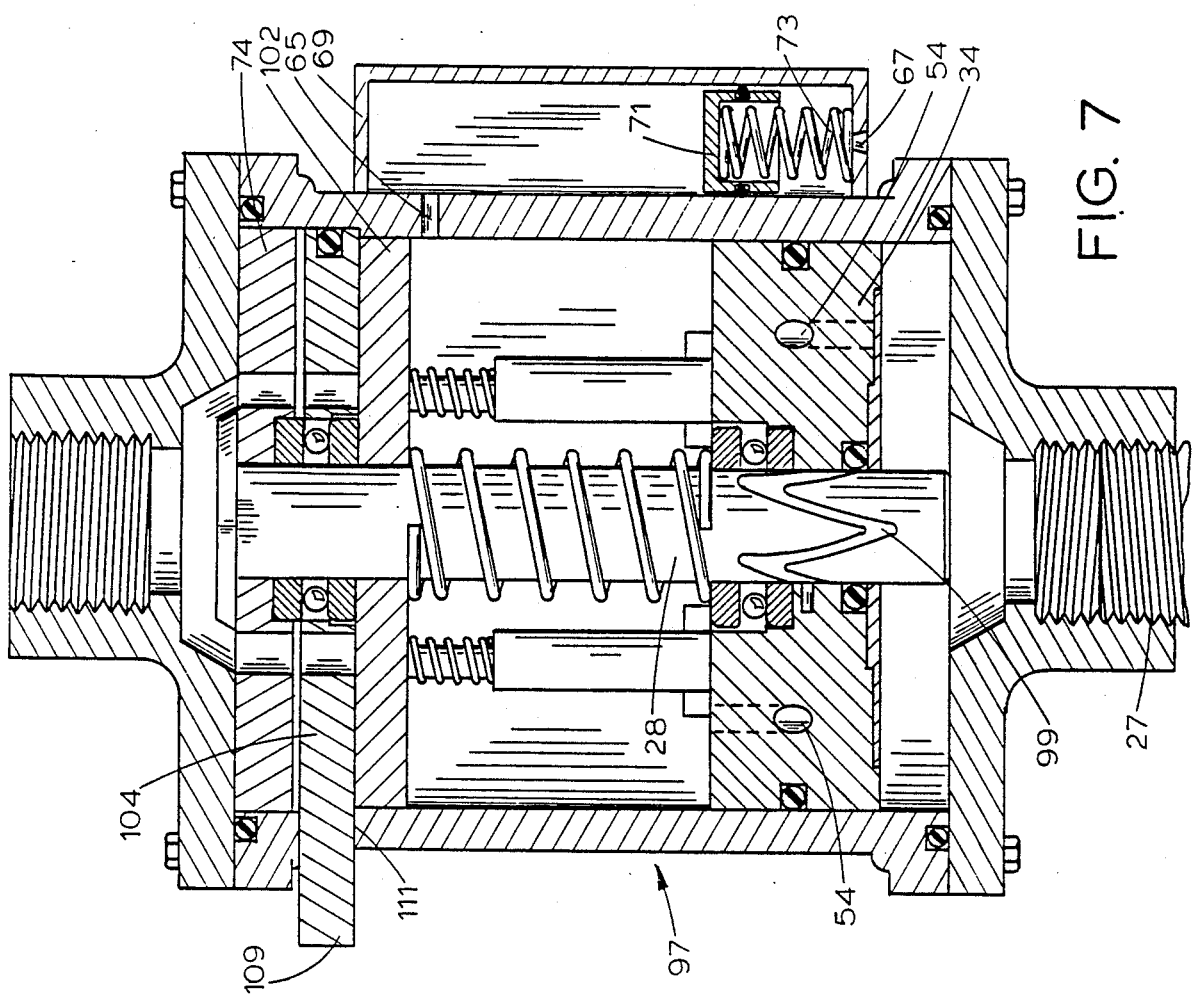
FIG. 7 is a partial cross-sectional view of the invention as adapted for use with a tabbed control plate and illustrating the angled inlet ports and the orientation of the actuator plate mid-way through a cycle.

Radially of the actuator plate 34 and spaced between the guide pins 46 angled fluid inlet ports, shown in FIG. 7 at 54, are formed to communicate fluid between the upstream and downstream surfaces of the actuator plate 34. The ports 54 are preferentially angled in the opposite direction as the helical groove 32, as shown by the broken lines at 54 in FIG. 7, so that the flow of pressurized fluid passing through the ports 54 will aid in the rotational movement of the actuator plate 34. The number and size of the ports 54 is dependent on the pressure and flow rate of the controlled fluid. In a working embodiment of the valve 10, four ports of one-eighth inch diameter each have proven desirable.

Also carried by the actuator plate 34 is a follower pin 56 received by the helical groove 32 when the shaft 28 is inserted through aperture 35 of the actuator plate 34. The follower pin 56 is fixed within the actuator plate 34 and tracks the helical groove 32. Accordingly, a longitudinal force exerted on a face of the actuator plate 34 will cause the plate to follow the path described by the helical groove 32. Thus, longitudinal motion of the plate 34 is generally accompanied by rotation of the plate, provided that the path of the follower pin 56 within the groove 32 presents an angular deflection. In combination, the actuator plate 34, shaft 28, helical grooves 32, and follower pin 56 provide means for actuating the valve 10.

Figure 3:
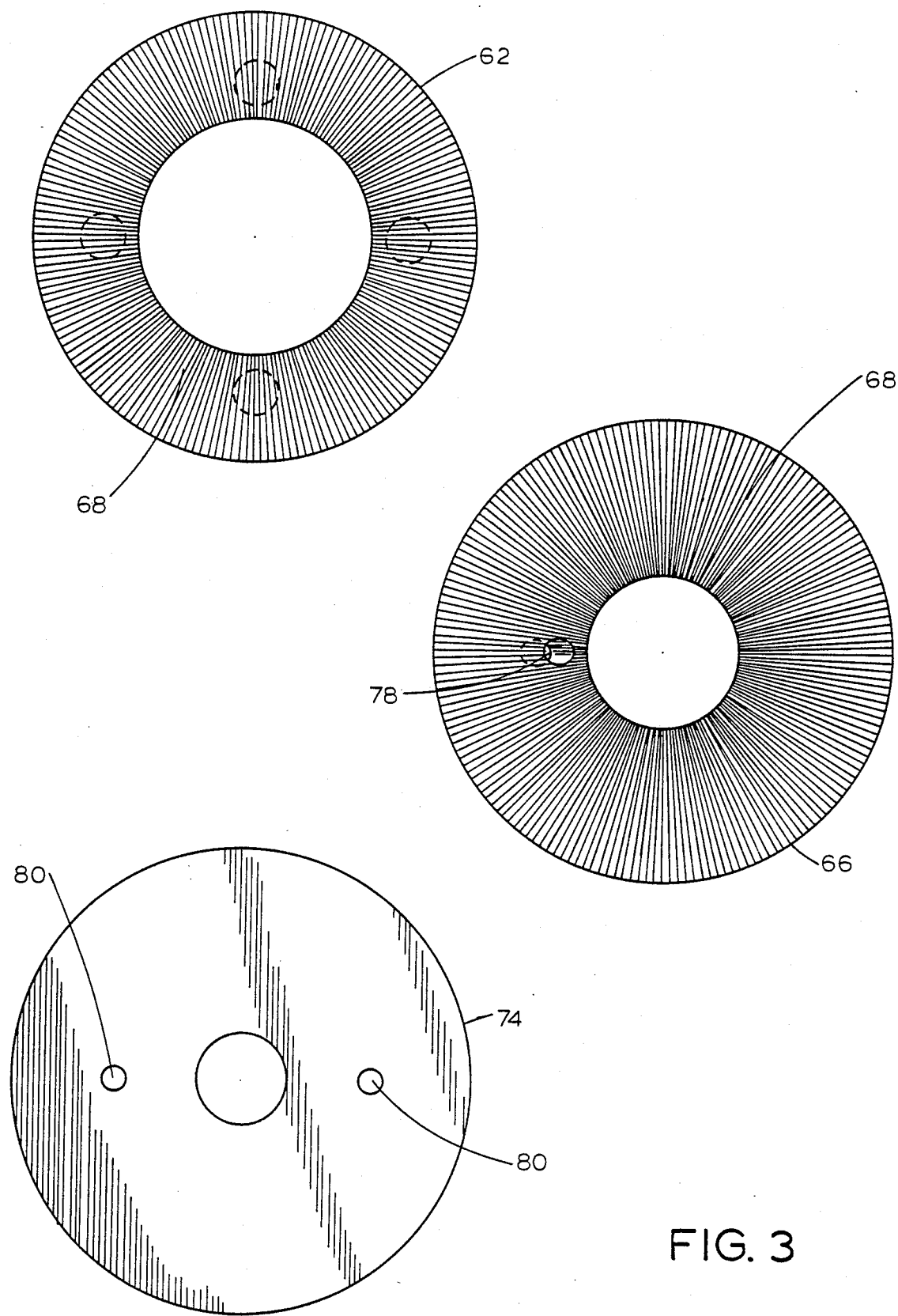
FIG. 3 is a plan view of a drive plate and an indexer plate employed in the embodiment of the invention illustrated in FIGS. 1 and 2.

A rotational drive or ratchet plate 62 is coupled to actuator plate 34 by the guide pins 46 received in guide bushings 64 of the ratchet plate 62. Downstream and contiguous with the ratchet plate 62 is an indexer plate 66. The adjacent surfaces of the two plates 62 and 66 are illustrated in FIG. 3. The radial lines in the figure on the faces of the plates represent engagable ratchet teeth, illustrated generally at 68. The ratchet teeth 68 present uni-rotational mating surfaces on the two plates 62 and 66, whereby rotation of the ratchet plate 62 in one direction results in the duplicative rotation of the indexer plate 66. When the ratchet plate 62 is rotated in the opposite direction, however, the ratchet teeth 68 fail to mate, but slide across one another and a low level of rotational force is imparted to indexer plate 66, hence the ratchet motion. In mechanical terms, the ratchet plate 62, the indexer plate 66 and the gear teeth 68 coact to comprise a pawl.

As illustrated in FIG. 1, a fluid-tight seal is formed between the indexer plate 66 and the casing 12 by an indexer plate O-ring 70 within a channel 72 formed in the edge of the indexer plate 66. The O-ring 70 permits the indexer plate 66 to rotate while maintaining the fluid-tight seal.

Downstream and coaxial with the two plates 62 and 66 is a stationary plate 74 which is affixed to the shaft flange 30. The plates 66 and 74 comprise coacting control surfaces which allow the valve to perform a fluid flow schedule as described in detail below. Additionally, a thrust bearing 76 is seated coaxially in a recess formed in the upstream surface of the stationary plate 74. The thrust bearing 76 extends toward the inlet end of the valve 10, through the indexer plate 66, serving to maintain the alignment of the shaft 28 in a manner similar to that previously described with reference to thrust bearing 44. In the preferred embodiment of the invention, the thrust bearing 76 does not extend beyond the upstream surface of the indexer plate 66 when the valve is assembled and in use.

Figure 4:
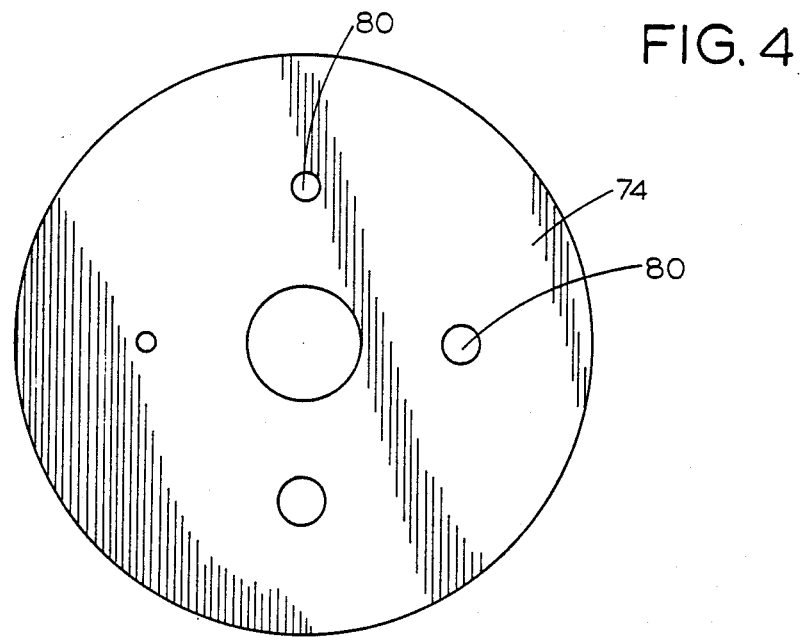
FIG. 4 is a plan view of a control plate for use with the embodiment of the invention illustrated in FIGS. 1, 2, and 7.

A center cylindrical portion of the ratchet plate 62 is removed so that the central portion of the upstream surface of the indexer plate 66 is in fluid communication with the cavity between the actuator plate 34 and the ratchet plate 62. The central portion of the indexer plate 66 also has one or more indexer plate ports 78 comprising throughbores of the plate 66. One or more stationary plate ports 80, which may align with one or more of the indexer plate ports 78, are formed in the stationary plate 74. Illustrated in FIG. 4 is a suitable stationary plate 74.

Finally, with further reference to FIG. 1, a central portion of the upstream surface of the outlet end plate 16 has been removed to provide for fluid flow through the stationary plate ports 80, the outlet end plate 16, and the threaded coupling 26 to the exterior of the valve 10. From the above description it can be seen that a system of ports and passageways has been defined whereby the cavity between the actuator plate 34 and the ratchet plate 62 may be brought into fluid communication with an outlet line of the valve 10.

Returning to the structure of the valve 10, a circular O-ring channel 82 is included on the downstream surface of the indexer plate 66 proximate to and encircling the thrust bearing 76. An O-ring 84 is retained in the channel 82 and provides a fluid-tight seal when the indexer plate 66 is impressed against the stationary plate 74, so that fluid which may be found around the thrust bearing 76 will not escape between the plates 66 and 74. A number of port O-rings 85 are also positioned between the plates 66 and 74. The O-rings 85 are placed in port O-ring channels 86 in the upstream surface of the stationary plate 74 and encircling the stationary plate ports 80. When the valve 10 is in use, the O-rings 85 are pressed against the downstream surface of the indexer plate 66 producing a fluid-tight seal around the stationary plate ports 80. Indexer plate 66 is restrained from moving upstream by a shoulder 88 in the casing 12.

A biasing spring 90, positioned around the shaft 28 and between the two thrust bearings 44 and 76, biases the actuator plate 34 against the inlet end plate 14 and acts to return the actuator plate 34 to a full upstream position. The ratchet plate 62 is biased by four guide pin springs 92 which are placed around the downstream portion of the guide pins 46. The springs 92 are compressed between the shoulder of the guide pins 46 and the ratchet plate 62 and force the ratchet teeth 68 of the ratchet plate 62 and indexer plate 66 to remain slidably engaged. That is, springs 92 permit the ratchet teeth 68 to slide against one another in the non-driving direction of rotation yet also force the ratchet teeth 68 of the plate 62 and 66 to engage when the ratchet plate is rotated in the opposite, driving direction.

In the course of operation of the valve 10, as pressurized fluid enters the valve 10 through the inlet end plate 14, the fluid exerts pressure against the upstream surface of the actuator plate 34 and begins to flow through the angled inlet ports 54 (FIG. 7) into the cavity between the actuator plate 34 and the ratchet plate 62. When the pressure of the fluid on the actuator plate 34 is greater than the resisting force of the biasing spring 90 and the natural friction against movement of the plate 34, the actuator plate 34 begins to move, the follower pin 56 tracking in the helical groove 32. The follower pin 56, in combination with the helical groove 32, causes the actuator plate 34 to rotate, following the path of the helical groove 32, as it moves longitudinally downstream. As the actuator plate 34 rotates, the guide pins 46, which are carried by the plate 34, also revolve describing a circle about the shaft 28.

This movement of the guide pins 46 also results in rotation of the ratchet plate 62. The ratchet teeth 68 of the adjacent surfaces of the ratchet plate 62 and the indexer plate 66 engage when rotated in the downstream direction of the helical groove 32. Accordingly, the indexer plate 66 is rotated along with the ratchet plate 62 and actuator plate 34.

A number of factors affect the travel of the actuator plate 34 along the helical groove 32. Initially, friction and the biasing spring 90 resist the motion of the plate 34. Additionally, air may be trapped in the cavity between the actuator plate 34 and the ratchet plate 62; the air must then be compressed by the action of the pressurized fluid on the actuator plate 34. Finally, the fluid itself may be entering the cavity through the angled inlet ports 54. The resistive force of compressed air and the biasing spring 90 increases linearly with a reduction in volume of the cavity caused by the advancing actuator plate 34. However, the fluid is essentially incompressable so that any fluid entering the cavity through the inlet ports 54 will serve to resist the downstream motion of the actuator plate by decreasing the volume available to the air. The result of these factors, provided the cavity does not communicate with an unpressurized outlet line, is that the force of biasing spring 90 and the pressure of the compressed air and fluid in the cavity will eventually balance the pressure of the fluid on the actuator plate 34; plate 34 will consequently stop travelling downstream.

It is necessary, therefore, to adjust the number and size of the inlet ports 54, the area of the upstream surface of the actuator plate 34, the length of the cavity between the ratchet plate 62 and the actuator plate 34, the strength of the biasing spring 90 and the length of the helical groove 32 together with the expected pressure and other physical properties of the fluid so that the actuator plate 34 will travel the entire length of the helical groove 32 thereby achieving the full amount of rotation of the angular deflection permitted by the groove 32.

In a working model of the valve 10, as illustrated in FIG. 1, used to control water at a pressure of approximately 70 pounds per square inch, the following parameters are used: the effective length of the helical groove 32 is one inch with an angular deflection of 90 degrees; the biasing spring 90 is six and one quarter turns of 14 gauge music wire with a relaxed length of 2.07 inches; the area of the upstream surface of the actuator plate 34 is approximately four and one-half square inches; there are four, one-eighth inch diameter angled inlet ports 54; and the uncompressed length of the cavity is approximatley one and three-eighths inches.

When the fluid pressure on both sides of plate 34 is approximately equal, the biasing spring 90 will act to move the actuator plate 34 upstream toward the inlet end plate 14. Again, the actuator plate 34 will rotate, tracking the path of the helical groove 32 by means of the follower pin 56. This rotation will also occur in the ratchet plate 62 through revolution of the guide pins 46 coupling the actuator plate 34 and the ratchet plate 62. On the return motion, however, ratchet plate 62 does not act to rotate the indexer plate 66, but instead the ratchet teeth 68 of the plates 62 and 66 slide over one another, and the indexer plate 66 remains stationary. In this manner, the indexer plate 66 is progressively rotated through the angular deflection of the helical groove 32 each time a fluid pressure pulse is directed against the actuator plate 34.

As stated previously, the plates 66 and 74 coact to create or to interrupt passageways permitting or restricting the flow of fluid through the valve 10. The passageways are formed by alignments of the indexer and stationary plate ports 78 and 80. For example, indexer plate 66 may have one port 78 and the stationary plate 74 may have two ports 80, as is illustrated in FIG. 3. Under these conditions, the valve 10 would be open only twice during each complete rotation of the indexer plate 66. Accordingly, with a helical groove 32 having an angular deflection of ninety degrees (90°), the valve 10 passes fluid on alternate reciprocations of the actuator plate 34, which reciprocations correspond to pressure pulses in the pressurized fluid. Alternatively, a stationary plate 74 such as the one illustrated in FIG. 4 may be used to control the magnitude of fluid flow, in which case the valve 10 will be open following each pressure pulse, but the fluid flow will vary in proportion to the cross-sectional area of the ports 80 in the stationary plate 74. By substituting various plates for the indexer and stationary plates 66 and 74 and adjusting the angular deflection of the helical groove 32, the valve 10 may be adapted to perform a large variety of pre-established schedules and flow rates.

Figure 2:
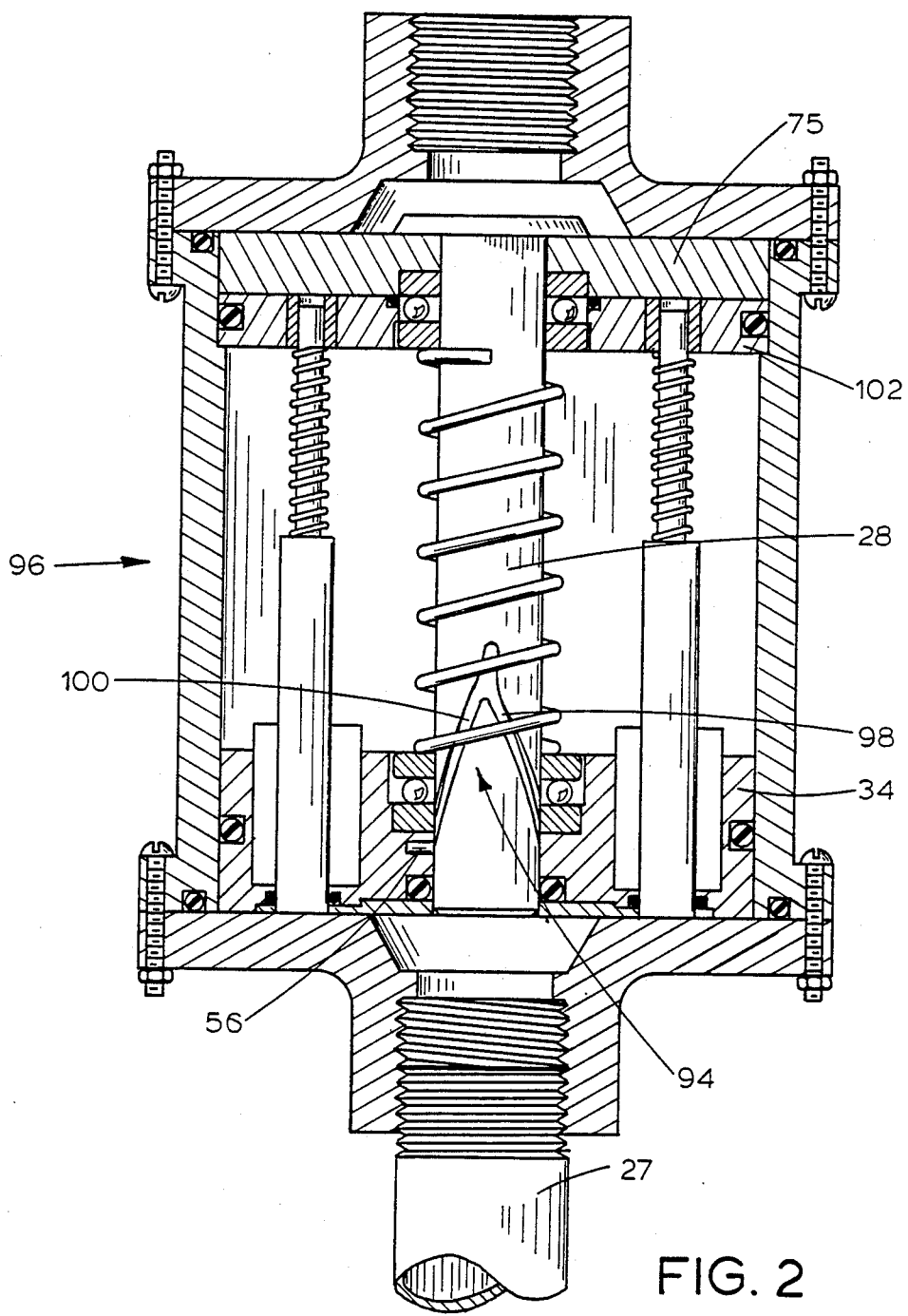
FIG. 2 is a partial cross-sectional view of a preferred embodiment of the improved scheduled fluid control valve employing a continuous series of generally helical grooves.

FIG. 2 illustrates in partial cross section a twoplate modification of the valve generally designated at 96, wherein the helical groove 32 of the valve 10 (see FIG. 1) is replaced by a series of generally helical grooves, indicated at 94. In the valve 96, return grooves 98 are linked to drive grooves 100 in an alternating manner to yield the series of grooves 94 which encircles the shaft 28. The drive grooves 100 are substantially similar to the helical grooves 32 of the valve 10 (see FIG. 1). The follower pin 56, instead of retracing the same groove on the return of the actuator plate 34, tracks in the succeeding return groove 98. Indexing of the valve 96 is achieved by successive tracking by the follower pin 56 in the grooves 98 and 100.

Appropriate tracking of the follower pin 56 to successive grooves 94 is achieved by providing a straight, longitudinal section at the beginning of each drive and return groove 98 and 100. The straight section prevents the follower pin 56 from retracing the previous groove 94 as a result of the substantial longitudinal forces of the pressurized fluid and biasing spring 90 on the actuator plate 34.

No ratchet plate or gear teeth are used in this embodiment owing to the fact that indexing is achieved by the continuous nature of the grooves 94. Accordingly, the guide pins 46 have been lengthened to couple the indexer plate, designated as a rotating plate 102, to the actuator plate 34. In other respects, the structure of the valve 96 is identical to that of valve 10.

Valve 96 functions similarly to valve 10 as well. The most significant difference is that rotation of the rotating plate 102 occurs on the return stroke of the actuator plate 34 as well as on the pressurized stroke thereof. Each complete pressure pulse of the fluid therefore results in two distinct rotational movements of the rotating plate 102 of an angular displacement comprising the total angular deflection of a drive groove 100 and a return groove 98.

Figure 5:
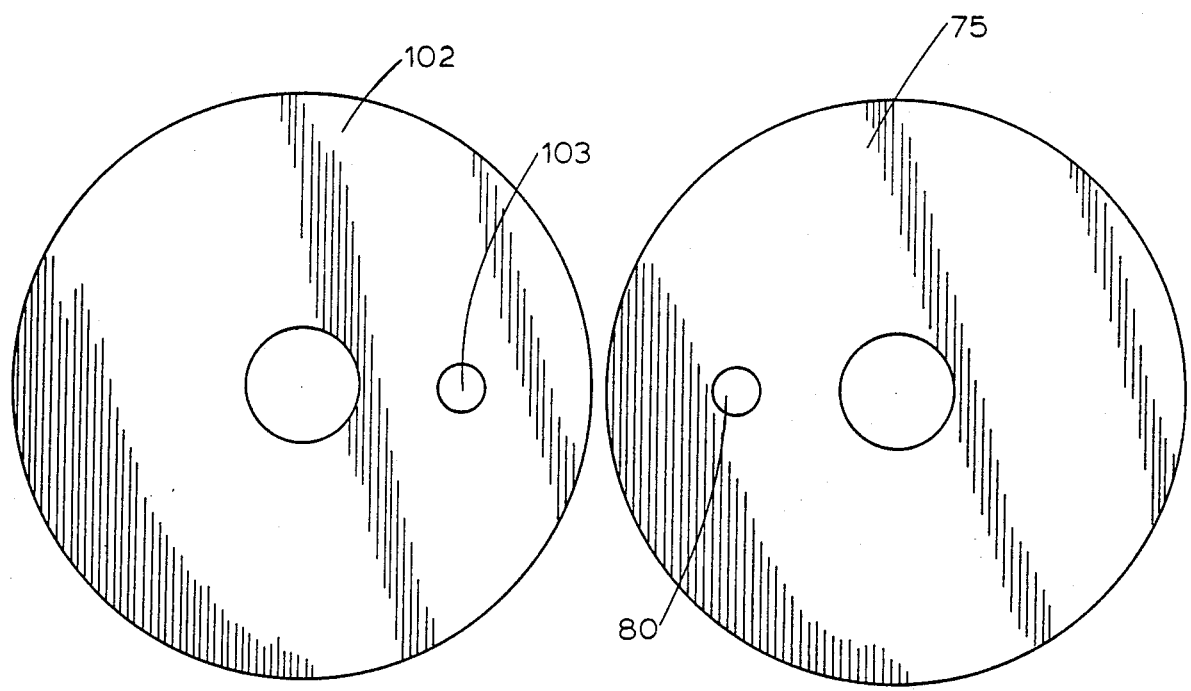
FIG. 5 is a plan view of two control plates for use with the embodiment of the invention illustrated in FIGS. 1, 2, and 7.

As illustrated in FIG. 5, the rotating plate 102 may be formed with one port 103 while a stationary plate 75 also has one port 80. Such a configuration of ports, when used with the valve 96 illustrated in FIG. 2, would result in a 1:2 ratio between the number of fluid flow (valve open) positions to the number of pressure cycles in the supply fluid. Therefore, the valve would open on every other time that pressurized fluid is applied to the valve through the fluid supply line 27. This ratio is a result of the construction of the groove 94, which produces a 180 degree rotation of the actuator plate 34 upon application of each complete pressure cycle in the supply line 27.

The valve generally designated at 97 in FIG. 7 shows the use of a continuous groove 99 on shaft 28 which produces a ninety degree (90°) rotation of the actuator plate 34 upon application of each complete pressure cycle in the fluid supply line 27. The continuous groove 99 is constructed in the same general configuration as described with respect to groove 94 in FIG. 2 except that the angular deflection of the groove 99 is less, requiring twice as many full downstream movements of the actuator plate 34 per full revolution about the shaft 28.

Thus, substitution of the ninety degree (90°) groove 99 for the one hundred eighty degree (180°) groove 94 in valve 96 (FIG. 2) would result in a 1:4 ratio between the number of fluid flow (valve open) positions to the number of pressurized cycles in the supply fluid.

Figure 6:
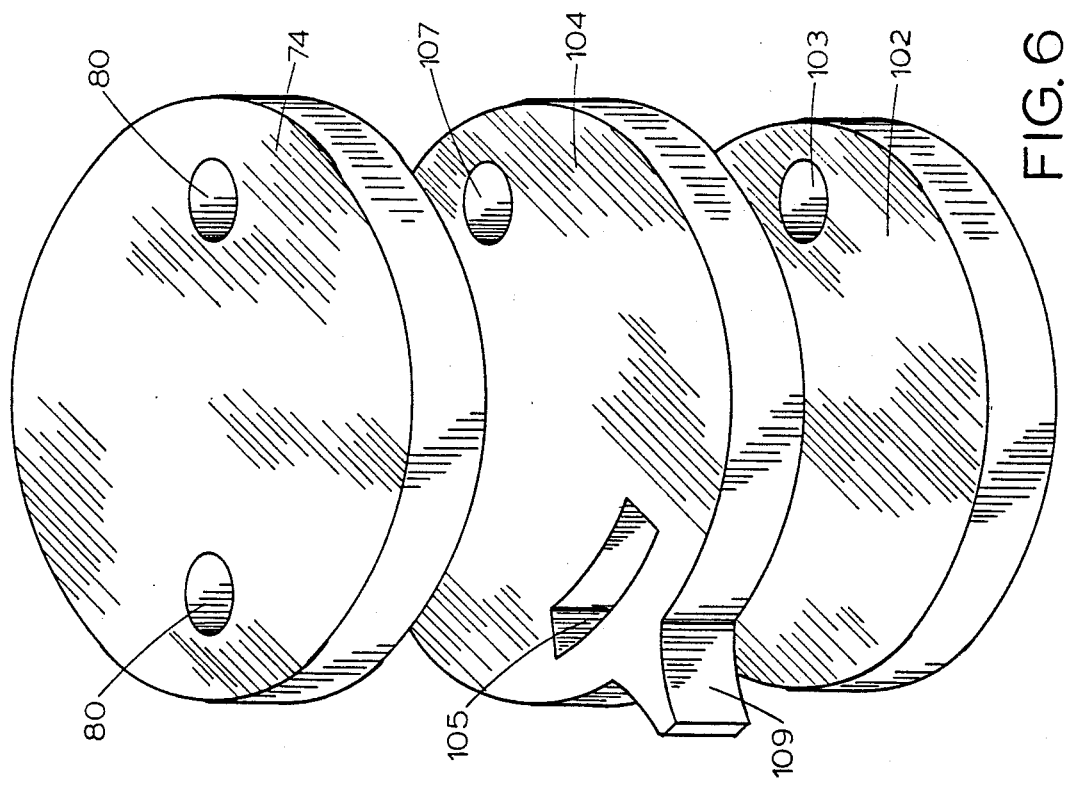
FIG. 6 is an exploded perspective view of control plates, including a tabbed control plate, for use with the embodiment of the invention illustrated in FIG. 7.

An additional tabbed plate 104 may be added to the valve 97 in FIG. 7. The tabbed plate 104 is positioned between the rotating plate 102 and the stationary plate 74. A tab 109 extends radially from the plate 104 through a slot 111 provided in the housing to the outside of the valve. A number of variously sized and positioned ports may be provided in the tabbed plate 104 which may be selectively aligned by manual rotation of the tabbed plate 104. For example, as illustrated in FIG. 6, a slotted port 105 and circular port 107 may be used. In one orientation, the slotted port 105 and circular port 107 may be aligned with the ports 80 of the stationary plate 74. The tabbed plate 104 may then be rotated so that only the slotted port 105 is aligned with a port 80. In this manner, when used with a valve having a ninety (90°) degree displacement per pulse (FIG. 7), the schedule of fluid flow through the valve may be manually altered from a 1:2 ratio to a 1:4 ratio. Of course, as indicated previously, a wide variety of angular deflections in the grove 99 as well as a variety of control plates may be used to provide a wide range of control sequence and ratios.

As further illustrated in FIG. 7, the valve 97 may be provided with a fluid pulse absorbtion chamber 69 for the purpose of temporarily absorbing a pressurized fluid pulse in a closed fluid system. The absorbtion chamber 69 is formed with an ambient air port 67 and a fluid cavity port 65 which is in fluid communication with the internal fluid cavity of the valve 97 at a point slightly upstream from the rotating plate 102.

A piston and seal assembly 71 and associated compression spring 73 are disposed within the chamber 69 in a manner such that the pressure of fluid passing through port 65 will cause the piston and seal assembly 71 to compress the spring 73, thereby temporarily absorbing a certain portion of the initial pressure pulse in the valve cavity.

The absorbtion chamber 69 may also be adapted to the variations of valve illustrated in FIGS. 1 and 2 as well as to valve 97 of FIG. 7. In applications of the invention in which a closed fluid system exists, and fluid is not permitted to escape from the valve chamber between pressure pulses, an absorbtion chamber 69 has proven to be desirable in providing absorbtion of fluid flow to permit sufficient downstream movement of the actuator plate 34 to insure that the actuator plate 34 continues to revolve about the shaft 28.

A second embodiment of the invention, shown in two stages of operation in FIG. 8, is a cylindrical control surface valve, indicated generally at 106. The exterior of the valve 106 consists of a generally cylindrical housing which includes an inlet portion, or inlet casing 108, and a generally cylindrical outlet portion, or outlet jacket 110. Pressurized fluid enters the valve 106 through an inlet threaded coupling 112 of the inlet casing 108. At the opposite end, the fluid exits the valve 106 through an outlet threaded coupling 114 of the outlet jacket 110. The couplings 112 and 114 are adapted for fluid-tight attachment to an inlet line 27 and outlet line (not shown), respectively. Mating threads 116 are provided on the inlet casing 108 and the outlet jacket 110 so that they may be threadedly connected, providing a fluid-tight seal. The threads 116 and the valve 106 accommodate disassembly of the valve 106 for repair or adjustment.

Axially disposed within the inlet casing 108 is a movable, hollow ratchet cylinder 118 which comprises the actuating means for this embodiment. The ratchet cylinder 118 closely fits inside the inlet casing 108 but may be rotated and moved longitudinally within the casing 108. Arranged about the outer surface of the ratchet cylinder 118 is a series of continuous, generally helical grooves 120. At least one follower pin 122 is inserted through the wall of the inlet casing 108 and tracks in the helical groove 120.

Ratchet cylinder 118 includes at least one ratchet outlet port 124 through the wall of the cylinder 118. Additionally, the ratchet cylinder 118 is open on its upstream end. Thus, pressurized fluid may be allowed to flow into the ratchet cylinder 118 and out through outlet ports 124.

The outlet jacket 110 is comprised of essentially two nested cylinders, an interior jacket cylinder 126 and an exterior jacket cylinder 128, which combine to form the jacket 110 in fluid communication with the exterior of the valve 106 through the outlet coupling 114. At least one valve port 130 perforates the interior jacket cylinder 126 so that the interior cavities of the casing 108 and the jacket 110 may be brought into fluid communication. An annular gasket, shown in detail in FIG. 9 at 132, is fitted into the inside wall of the interior jacket cylinder 126 and generally serves as a fluid-tight seal between the ratchet cylinder 118 and the interior jacket cylinder 126. The annular gasket 132 includes one or more gasket ports 134 which may coincide with the valve ports 130 of the interior jacket cylinder 126. A biasing spring 136 is interposed between the outlet jacket 110 and the downstream surface of the ratchet cylinder 118.

The valve 106 performs its control function in a manner substantially similar to that of the flat plate embodiment of the invention described above. Reciprocation of the ratchet cylinder 118 along the longitudinal axis of the valve 106 will result in stepwise rotation of the ratchet cylinder 118. Recriprocation is achieved by the intermittent application of pressurized fluid to the upstream surface of the ratchet cylinder 118 together with the return force exerted by the biasing spring 136 on the downstream surface of the ratchet cylinder 118.

The ratchet cylinder 118, the annular gasket 132, and the interior jacket cylinder 126 comprise control surfaces which, in combination with their respective ports and the stepwise advance and rotation of the ratchet cylinder 118 combine to perform a scheduled valve sequence. In the absence of pressurized fluid, the biasing spring 136 forces the ratchet cylinder 118 against the upstream end of the inlet casing 108. In this position, the follower pin 122 is at the extreme downstream end of one of the helical grooves 120, and the downstream end of the ratchet cylinder 118 remains extended through the annular gasket 132. The annular gasket 132, at this point, provides a fluid-tight seal between the ratchet cylinder 118 and the outlet jacket 110.

As pressurized fluid enters the valve 106, the ratchet cylinder 118 is forced downstream, following the path determined by the tracking of the follower pin 122 in the helical groove 120. When the ratchet cylinder 118 has traveled the full downstream length of the groove 120, the outlet ports 124 may coincide with the gasket ports 134 and valve ports 130. If one or more of the ports 124, 130 and 134 simultaneously coincide, the valve 106 is open and pressurized fluid will be allowed to flow. The schedule of the valve 106 or the rate of flow of fluid through it may be adjusted, in a manner similar to that described with respect to the flat plate embodiment, by altering the number and size, or position, of the ports 124, 130 and 134.

As further illustrated in FIG. 8, a fluid escape port 129 may be formed in the downstream end of the interior jacket cylinder 126 to relieve any fluid which may become entrapped within the interior jacket cylinder 126 and which might result in restriction of the movement of the ratchet cylinder 118 in response to each new pressure cycle in the fluid supply.

It should be clear from the foregoing description of the preferred embodiments that other means could be employed in accomplishing the broad purposes of the invention. Such modifications may include among others, addition of supplementary follower pins 56, changes in the position or use of a number of the various O-rings, as well as the use of a variety of coacting control plate or cylinder configurations. It should be understood this description is intended to illustrate but not to limit the scope of the invention as defined in the following claims.

I claim:

1. A scheduled fluid control valve comprising:
  (a) a generally cylindrical housing having an upstream inlet portion and a fluid supply attached to said inlet portion and a downstream outlet portion which is a generally cylindrical jacket having at least one throughbore port,
  (b) a cylinder relatively movable with respect to said housing,
  (c) a stationary annular gasket having at least one radially directed port, coinciding with a port of said outlet portion of said housing, providing a fluid-tight seal between said inlet portion and said outlet portion,
  (d) at least one throughbore port in said cylinder which can be selectively brought into fluid communication with one of said ports of said annular gasket as said cylinder is slidably and sealably movable within said gasket, and
  (e) groove and follower means for producing relative movement of said cylinder with respect to said annular gasket for selectively moving said ports into and out of throughflow alignment in a preestablished sequence.

2. The valve as defined in claim 1 wherein said groove and follower means comprises a series of alternating, symmetrical and generally helical grooves defining a continuous pathway about the longitudinal axis of said relatively movable cylinder, and at least one pin mounted in said housing and extended into said grooves.

* * * * *